United States Patent [19]
Flisik et al.

[11] Patent Number: 5,414,762
[45] Date of Patent: May 9, 1995

[54] TELEPHONY CONTROLLER WITH FUNCTIONALITY COMMAND CONVERTER

[75] Inventors: Robert C. Flisik; Mark Johnson, both of Cincinnati, Ohio

[73] Assignee: Q.SYS International, Inc., Cincinnati, Ohio

[21] Appl. No.: 183,992

[22] Filed: Jan. 18, 1994

[51] Int. Cl.6 ............................................. H04M 3/22
[52] U.S. Cl. ................................... 379/198; 379/201; 379/94
[58] Field of Search ............... 379/157, 198, 201, 202, 379/203, 204, 205, 206, 207, 225, 227, 231, 232, 234, 268, 269, 94; 370/62, 94.1

[56] References Cited

U.S. PATENT DOCUMENTS

| | | | |
|---|---|---|---|
| 4,259,549 | 3/1981 | Stehman | 379/269 |
| 4,796,294 | 1/1989 | Nakagawara | 379/269 |
| 4,866,758 | 9/1989 | Heinzelmann | 379/94 |
| 4,996,685 | 2/1991 | Farese et al. | 370/58.1 |
| 5,007,080 | 4/1991 | Macmillan et al. | 379/269 |
| 5,097,528 | 3/1992 | Gursahaney et al. | 379/67 |
| 5,187,787 | 2/1993 | Skeen et al. | 395/600 |
| 5,235,595 | 8/1993 | O'Dowd | 370/94.1 |

*Primary Examiner*—James L. Dwyer
*Assistant Examiner*—Scott Wolinsky
*Attorney, Agent, or Firm*—Morris, Manning & Martin

[57] ABSTRACT

A telephony controller for controlling a private automatic branch exchange (PABX) is disclosed that utilizes a single functionality command protocol to reduce the data traffic on a computer network or the like used to control a PABX. The telephony controller includes a functionality command converter, a communication layer for communicating with computer terminals on the computer network, and a PABX interface for communicating with the PABX. The single functionality command protocol uses a generic command format for a number of function commands that are converted by the functionality command converter into the PABX commands corresponding to the vendor specific PABX. The functionality converter generates the PABX commands to implement a function command and monitors the PABX to determine whether the command has been implemented. The functionality command converter generates data messages corresponding to the outcome of the functionality command execution which are transmitted to the command originating terminal. Additionally, the telephony controller is capable of controlling different vendor PABXs without requiring any change in the communication format between the controller and the computer terminals.

17 Claims, 3 Drawing Sheets

TELEPHONY CONTROLLER WITH FUNCTIONALITY COMMAND CONVERTER

FIELD OF THE INVENTION

This invention relates generally to telephone communication systems and, more particularly, to telephony control with a private automatic branch exchange (PABX).

BACKGROUND OF THE INVENTION

Private automatic branch exchanges are well known in the telephone communications industry. These devices interface incoming telephone lines from a public telephone utility service with multiple communication devices within a facility. These communication devices include telephones, facsimile transmission machines, and other telephone communication devices. The PABX uses digital information provided by the public telephone utility that is associated with the incoming call to route the call within the facility and to monitor the call as well as perform other control functions. The control functions performed by a PABX are generally considered to be primitive and not very extensive.

Prior PABXs have been provided with the capability of interfacing with a computer system. In a facility where there are numerous communication devices that couple to the telephone utility through the PABX, the telephone communications consumer could program a computer system to send data to the PABX to perform higher level telephony control of the telephone communications within the facility. To do so, the consumer had to expend considerable time and effort to develop a computer program that implemented the telephony control functions that the consumer envisioned. Additionally, the computer program would have to provide telephony control messages to the PABX in a protocol specific to the PABX being used. Such a computer system and program requires an extensive amount of resources to develop and to maintain. Also, if the facility decided to obtain a PABX that used a different protocol, the existing telephony control program would have to be scrapped. As a consequence, only large users of telephone communication services undertook such a task.

Recognizing that the higher level functions achieved by the custom programs were desirable in smaller installations, customized telephony servers were developed for providing a set of predetermined telephony functions for a particular vendor's PABX. In this system, the telephony server would be interposed between the PABX and computers or the like to utilize the digital information available from the PABX. The telephony server would communicate with the PABX in the manufacturer's protocol to glean information regarding telephone calls that could be used by the computer. The computer would use the information to access data needed by the recipient of the telephone call which was routed through the PABX. In this manner, data could be displayed on the computer screen as the telephone call was being answered.

Two disadvantages are present in the previously known telephony servers. First, the telephony servers were developed to communicate in a particular PABX protocol and to interface with a particular vendor's PABX. As a consequence, a facility that desired the functionality of a telephony server would also have to purchase a PABX that utilized the protocol for which the telephony server was designed. Second, previously known telephony servers required the computer to communicate with the telephony server in the PABX protocol. Thus, each computer station had to have the processing capability necessary to generate the appropriate telephony control commands required by the PABX. Further, to ensure that the status information generated by the PABX was sent to the correct computer station, the telephony server used the physical addresses of the computer stations. This caused the disadvantage that each computer could only receive status information related to its physical address which could not be easily altered.

Another problem associated with previously known telephony servers is the limitation that they arbitrate access to the PABX for a number of computers in a facility and do not generate the PABX commands for a telephony control event. Rather, each computer communicated with the PABX through the telephony server to cause the telephony control event. Because a high level telephony control event requires several PABX commands as well as monitoring communication device status through the PABX, the computer had to perform interactive processing with the PABX to achieve the desired higher level function through the telephony server. If the computer was on a token ring network or some other type of network arrangement that coupled many computers together and to the telephony server, the telephony data message traffic generated by the computers may increase to a point that interferes with other communication between the computers or that limits the number of devices that may be coupled to the network.

What is needed is a telephony server that does not require a computer to communicate with a PABX in a vendor specific protocol. What is needed is a telephony server that obtains status information or controls a PABX without extensive message traffic from a computer.

SUMMARY OF THE INVENTION

A telephony server built in accordance with the principles of the present invention provides an interface to a PABX that does not require a computer to communicate in a vendor specific PABX protocol and that converts a high level functionality command from a computer into PABX commands needed to perform the telephony control event. The inventive system includes a communication layer to transmit and receive messages from a computer, a PABX communication interface for controlling and querying the PABX, and a functionality command converter for converting a functionality command from a computer into the necessary data messages in the vendor specific PABX protocol to achieve the functionality of the requested command.

The inventive system is achieved by using a single functionality command protocol that is encapsulated within a commonly known network communication protocol. This permits the inventive telephony controller to communicate with computers regardless of the hardware or software configuration of any computer on the network. The functionality commands that conform to the single protocol are preferably encapsulated within a TCP/IP protocol on a physical network such as ETHERNET or a token ring network. Alternatively, the link between the telephony controller and the computer could be achieved using asynchronous communication over a RS-232 line that utilizes the single functionality command protocol. The functionality command protocol supports a group of high level functionality commands that permit a computer user to make calls, receive calls, make conference calls, monitor another user's telephone, and other higher level functions by issuing a single command for each function to the telephony controller of the present invention.

Because the telephony controller of the present invention implements the higher level functionality under its own program processing, some of the functionality may be achieved without utilizing the PABX. For example, in making a telephone call to another communication device, the telephony server can interrogate the PABX to determine whether the communication device is available. If it is not, the telephony controller may then generate and transmit a message to a computer associated with the unavailable communication. The transmission of this data message would occur through the network or other computer system interface rather than through the PABX.

One advantage of the present system is the ability to associate any communication device or computer with a user. Thus, the functionality provided by the telephony controller may be accessed by a user on any computer coupled to the telephony controller through the communication layer. To achieve this flexibility, the user identifies an extension number for the computer station by transmitting a log on message to the telephony controller. In response, the controller allocates the monitored line corresponding to the extension number to the computer station. The controller then generates PABX commands in response to functionality commands received from the computer that perform telephony control events for the allocated monitored line.

Another advantage of the present invention arises from the use of a library of function command routines to configure a functionality command converter for a particular vendor's PABX and corresponding protocol. Thus, the telephony controller may be altered to control a variety of PABXs by changing the PABX interface and function command routines. Additionally, the telephony controller of the present invention may be configured to control more than one PABX in a facility by providing the interface for each PABX, the function command routines corresponding to each PABX, and identifying the lines to be monitored by each PABX. Heretofore, this flexibility was not available in telephony servers.

These and other advantages of the present invention will become apparent to the reader from the following description and accompanying drawings.

DETAILED DESCRIPTION OF THE INVENTION

Figure 1:
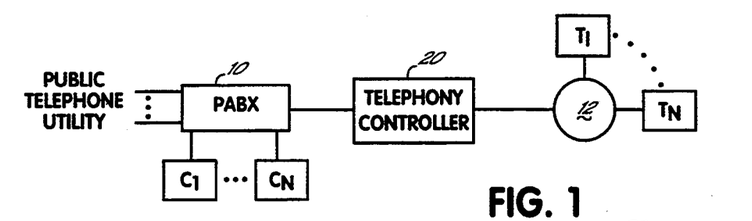
FIG. 1 is a block diagram of a facility utilizing a telephony controller that incorporates the present invention.

A typical system envisioned to utilize a telephony controller built in accordance with the principles of the present invention is shown in FIG. 1. In the facility depicted there, a PABX 10, such as a SX-2000 ® manufactured by Mitel Corporation of Ontario, Canada, couples trunk lines from the public telephone utility service to various communication devices $C_1$ to $C_N$. These communication devices include telephones, facsimile transmission machines, or the like. Coupled to the PABX is a telephony controller 20 made in accordance with the principles of the present invention and discussed in more detail below. The telephony controller is coupled to a number of terminals $T_1$ to $T_N$ through a network 12 such as an ETHERNET or token ring type. Terminals $T_1$ to TN may be any type of computer processing system that may be coupled to a communication network. Each of these computers may also be a communication device if it is coupled to a digital data phone line, known as an ISDN line, through the PABX. A known digital telephone interface card for providing such a function is a Planet ISDN card manufactured by Euronis of Paris, France.

Additionally or alternatively, terminals may be coupled to the telephony controller 20 by a serial line operating in accordance with the RS-232 standard. Preferably, this serial line is asynchronous and operates at a 9600 baud rate. Preferably, the network that couples the terminals $T_1$ to $T_N$ together utilizes a TCP/IP protocol; however, other communication protocols may be used as long as they are capable of encapsulating the functionality commands that conform to the single functionality command protocol of the present invention.

In accordance with the principles of the present invention, the telephony controller 20 monitors a group of trunk lines through the PABX. When a user is granted access to the telephony controller through one of the computer terminals coupled to it, the telephony controller allocates one of the monitored trunk lines to the terminal that corresponds with an extension number supplied by the user. Thus, any of the terminals $T_1$ to $T_N$ may be correlated to any of the monitored trunk lines. Because the telephony controller does not predefine the correlation of a particular trunk line to a particular terminal or communication device, the system utilizing the inventive controller has greater flexibility than those previously known.

Figure 2:
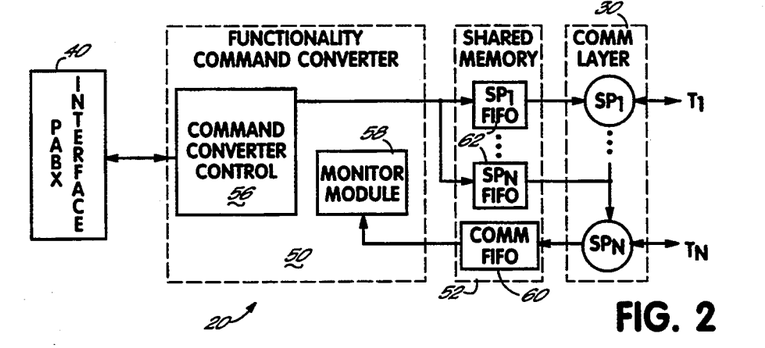
FIG. 2 is a block diagram of the structure of the telephony controller made in accordance with the principles of the present invention.

A block diagram of the program that operates telephony controller 20 is shown in FIG. 2. The program includes a communication layer 30 that together with the operating system used in the controller supports the preferred TCP/IP protocol to handle the communication between the telephony controller 20 and the terminals $T_1$ to $T_N$ coupled to the controller 20. The controller 20 also includes a PABX interface 40 that supports the vendor specific PABX protocol for communicating messages to the PABX. Interposed between the PABX interface 40 and the communication layer 30 is a functionality command converter 50 and shared memory 52. The functionality command converter 50 preferably communicates with the communication layer 30 by two unidirectional communication paths through the shared memory 52, although a single bidirectional path may be utilized. The interface between the PABX interface 40 and the functionality command converter 50 is a bidirectional path but may be a pair of unidirectional paths. Preferably, the telephony controller 20 is implemented in a microcomputer that utilizes an Intel 386/486 microprocessor and which has at least eight (8) megabytes of random access memory (RAM) and a mass storage device with at least 170 megabytes storage capability.

The functionality control converter 50 receives a functionality command from a computer terminal through the communication layer 30. The functionality command converter 50 verifies that the command is supported and that the parameters of the command are correct. After checking, via the PABX 40, the availability of the communication devices needed to implement the command, the functionality command converter 50 generates the PABX commands that implement the requested functionality command. Status messages from the PABX are used to determine if the command was successfully implemented. If it was, a confirmation message is transmitted through communication layer 30 to the command originating terminal. If the command failed, a failure message indicating the failure cause is transmitted to the command originating terminal. In response to some failures, an alternative communication path, such as communicating with a terminal associated with the indicated recipient of a call, is performed.

The PABX interface 40 is typically available from a PABX vendor. The interface includes the hardware and software necessary to support the interface. The command converter 50 includes a library of function command routines that incorporate the data parameters from the function command received from a terminal into the PABX commands that conform to the vendor specification for performing a telephony control event within the PABX. An example of such an interface is the AT&T ASAI software library and AT&T ISDN communication card. The PABX commands for this interface are provided in Callvisor Adjunct/Switch Application Interface Installation & Reference Manual, also available from AT&T. One of ordinary skill in the art would be able to generate the PABX commands necessary to perform telephony control events by referring to this manual.

The controller 20 of the present invention implements a set of functionality commands capable of being performed through most known PABXs. Preferably, these functions include (1) make a call (2) answer a call, (3) clear a call, (4) hold a call, (5) retrieve a 15 call, (6) transfer a call, (7) pick up a call ringing elsewhere, (8) retrieve a call held elsewhere, (9) consultation hold of a call, (10) alternate a call, (11) conference call, (12) split conference a call, (13) clear a call and return to a call on consultation hold, and (14) output pulse digits.

The generic structure of the messages used by the terminals to communicate the desired function to the telephony controller 20 is shown in Table 1. This structure conforms to the preferred single functionality command protocol for the present invention. Other protocol schemes may be used as long as they are independent of the PABX protocol.

TABLE 1

| FC FC FC: EXT EXT EXT EXT: PD PD PD PD PD PD PD: CKS CKS <CR> |
|---|
| FC = Function Command Character |
| EXT = Extension Identifier Character |
| PD = Parameter Data Character |
| CKS = Checksum Digital Character |

Figures 4, 5:
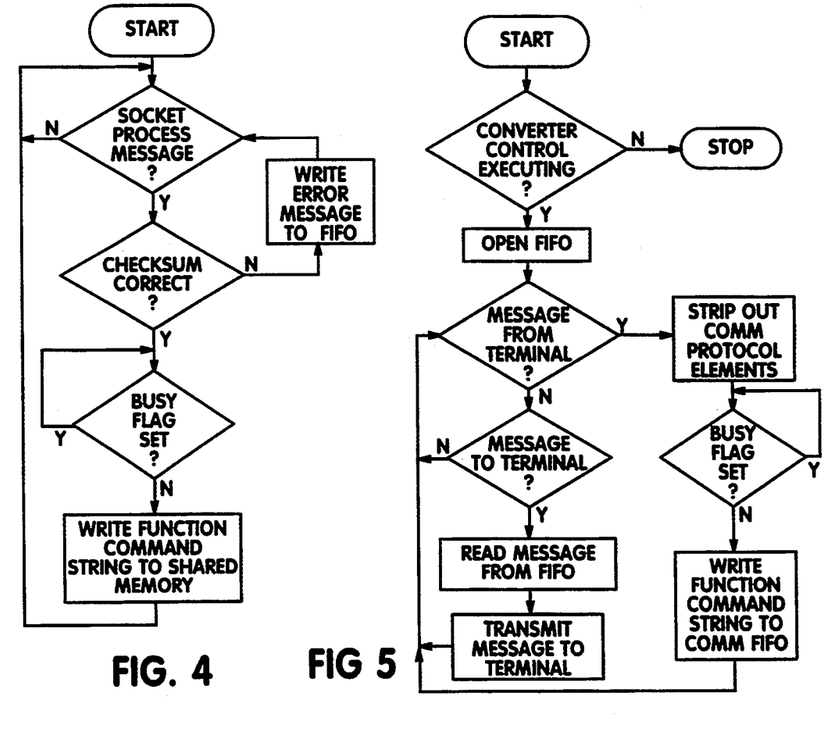
FIG. 4 is a flow chart that represents the processing performed by the monitor module of the telephony controller of the present invention.
FIG. 5 is a flow chart that represents the processing performed by a socket process of the telephony controller of the present invention.

As shown in Table 1, each command formatted in accordance with the preferred single functionality command protocol begins with a three ASCII character string to identify the function command. The functions and the corresponding strings that identify the functions are shown in FIG. 5. Following the function identifier is a colon which is used to delimit each field of the command, although other delimiter characters may be used. Following the first colon is a requesting user extension identifier. Preferably, these characters are ASCII characters that represent decimal digits. After the second colon to delimit the user extension identifier, a command parameter is provided. For example, the make call function command requires a parameter identifying the telephone number to which the call is to be placed. Following the final colon delimiter is a checksum that is utilized for verifying the content of the functionality command. Preferably, the checksum is calculated by summing the ASCII value of all the characters in the command string (except the checksum), dividing the sum by 256, and using the two digit hexadecimal representation of the remainder. Other schemes to verify or detect data transmission errors may be utilized in the present invention. Following the checksum is an ASCII character representing a carriage return to indicate the end of the command string, although other string termination characters may be used. Preferably, the command fields of the single functionality command protocol have a free form length and do not require filler or padding characters, although a single functionality command protocol may use a fixed field format.

The formats and possible response messages for each of the preferred functionality commands is shown in Table 2.

TABLE 2

| FUNCTION | COMMAND FUNCTION FORMAT | INITIAL RESPONSE FORMAT | POSSIBLE RESPONSE MESSAGE FORMATS |
|---|---|---|---|
| CALL FUNCTION | MKC:xxxx:yyyy yyyyyy | mkc:ok:xxx Acknowledges make call order | cs:cd:xxxx Call delivered from extension xxxx |
| | XXXX = Extension identifier | | cf:bz:xxxx Call not delivered, destination busy |
| | yyyyyyyyyyy = Destination number | | cs:an:xxxx Call delivered from xxxx has been answered |
| | | | cf:fu:xxxx Call not delivered, failure cause unknown |

TABLE 2-continued

| FUNCTION | COMMAND FUNCTION FORMAT | INITIAL RESPONSE FORMAT | POSSIBLE RESPONSE MESSAGE FORMATS |
|---|---|---|---|
| | | | cf:un:xxxx<br>Call not delivered,<br>uncontrolled origin |
| ANSWER CALL | ANS:xxxx | ans:ok:xxxx<br>Acknowledges<br>answer call order | cs:an:xxxx<br>Call answered at<br>extension xxxx |
| | xxxx =<br>Extension<br>Identifier | | cf:an:xxxx<br>Failed to answer call at<br>extension xxxx |
| CLEAR CALL | CLR:xxxx | clr:ok:xxxx<br>Acknowledges<br>clear order | cs:cl:xxxx<br>Call cleared at<br>extension xxxx |
| | xxxx =<br>Extension<br>Identifier | | cf:cl:xxxx<br>Failed to clear<br>call at xxxx |
| HOLD CALL | HLD:xxxx | hld:ok:xxxx<br>Acknowledges<br>hold call order | cs:hd:xxxx:yyyy<br>Holding other<br>party |
| | xxxx =<br>Extension<br>Identifier | | Call at extension xxxx<br>has been placed on hold<br>yyyy is the party on hold<br>cs:hl:xxxx:yyyy<br>Held by other party<br>Call at extension xxxx<br>has been placed on hold<br>yyyy is the holding party<br>cf:hd:xxxx<br>Failed to place call<br>on hold at xxxx |
| RETRIEVE CALL | RTV:xxxx | rtv:ok:xxxx<br>Acknowledges<br>retrieve call order | cs:rh:xxxx<br>Successfully<br>retrieved call<br>held at extension xxxx |
| | xxxx =<br>Extension<br>Identifier | | cf:rh:xxxx<br>Failed to retrieve<br>call held at xxxx |
| TRANSFER CALL | TFR:xxxx:yyyy | tfr:ok:xxxx<br>Acknowledges<br>transfer call order | cs:tr:xxxx<br>Transfer<br>complete from<br>extension xxxx |
| | xxxx =<br>Extension<br>Identifier | | cf:tr:xxxx<br>Failed to transfer<br>call from<br>extension xxxx |
| | yyyy =<br>Destination Extension<br>For Transfer | | |
| PICKUP CALL RINGING ELSEWHERE | PCL:xxxx:yyyy | pcl:ok:xxxx<br>Acknowledges<br>pickup call order | cs:pc:xxxx<br>Call picked up at<br>extension xxxx |
| | xxxx =<br>Extension Issuing<br>Pickup Order | | cf:pc:xxxx<br>Failed to pick up<br>call at extension<br>xxxx |
| | yyyy =<br>Extension Where<br>Call Is Ringing | | |
| RETRIEVE CALL HELD ELSEWHERE | RTO:xxxx:yyyy | rto:ok:xxxx<br>Acknowledges<br>retrieve call held<br>elsewhere order | cs:ro:xxxx<br>Call retrieved at<br>extension xxxx |
| | xxxx =<br>Extension Issuing<br>Order | | cf:ro:xxxx<br>Failed to retrieve<br>call at extension<br>xxxx |
| | yyyy =<br>Extension Where<br>Call Is On Hold | | |
| CONSULTATION HOLD CALL | HLC:xxxx | hlc:ok:xxxx<br>Acknowledges<br>Consultation Hold<br>Call order | cs:hd:xxxx<br>Call at extension<br>xxxx has been<br>placed on hold |
| | xxxx =<br>Extension<br>Identifier | | |
| | | | cf:hd:xxxx<br>Failed to place call on<br>hold at extension xxxx |
| ALTERNATE | ALT:xxxx | alt:ok:xxxx | cs:al:xxxx |

TABLE 2-continued

| FUNCTION | COMMAND FUNCTION FORMAT | INITIAL RESPONSE FORMAT | POSSIBLE RESPONSE MESSAGE FORMATS |
|---|---|---|---|
| CALL | xxxx = Extension Issuing Order | Acknowledges alternate call order | Call alternated at extension xxxx<br><br>cf:al:xxxx<br>Failed to alternate calls at extension xxxx |
| CONFERENCE CALL | CNF:xxxx<br><br>xxxx = Extension Issuing Order | cnf:ok:xxxx<br>Acknowledges conference call order | cs:cf:xxxx<br>Conference established<br><br>cf:cf:xxxx<br>Conference failed |
| SPLIT CONFERENCE CALL | SCC:xxxx<br><br>xxxx = Extension Issuing Order | scc:ok:xxxx<br>Acknowledges split conference call order | cs:sp:xxxx<br>Calls split from station xxxx<br><br>cf:sp:xxxx<br>Failed to split calls at station xxxx |
| CLEAR CALL, Return To Call On Consultation Hold | CCC:xxxx<br><br>xxxx = Extension Issuing Order | ccc:ok:xxxx<br>Acknowledges order to clear active call and return to the call on consultation hold | cs:cl:xxxx<br>Call cleared at extension xxxx<br><br>cf:cl:xxxx<br>Failed to clear call at xxxx |
| OUTPUT DIGITS | OPD:xxxx:yyyy<br>yyyy<br><br>xxxx = Extension From Which Digits Are Outpulsed<br><br>yyyy = Digits To Be Outpulsed | opd:ok:xxxx<br>Acknowledges Outpulse digits order | op:cm:xxxx<br>Outpulsed digits at extension xxxx<br><br>of:of:xxxx<br>Failed to Outpulse digits at extension xxxx |

With reference to FIG. 2, functionality command converter 50 includes a command converter control module 56 and a monitor module 58. Converter control module 56 interfaces with the operating system, which in the preferred embodiment is the SCO version, Release 4.2 of the UNIX operating system available from Santa Cruz Operations of Santa Cruz, Calif., to control the processing of the functionality command converter 50. The monitor module 58 is a process that is initiated or spawned by the converter control 56 to receive communication from the communication layer 30, verify the syntax of the communication, oversee access to the telephony controller, and pass verified commands and parameters to the converter control module 56. Communication layer 30 is shown to further include a number of socket processes $SP_1$ to $SP_N$. These socket processes are created to support communication between a computer terminal and the functionality command converter 50. A socket process is initiated for each terminal accessing controller 20. Each socket process monitors the communication activity between the socket process and the terminal. Should no communication occur between the terminal and the socket process within a predetermined time, the socket process is terminated along with the communication path to the terminal.

Communication between converter control module 56, monitor module 58, and the socket processes $SP_1$ to $SP_N$ is accomplished through a shared memory 52. For communication from the socket processes to the monitor module 58, the converter control 56 allocates a communication First In First Out (FIFO) 60 that receives all of the functionality commands from the socket processes. Converter control 56 also establishes FIFOs 62 in the shared memory for each socket process as it is created. These FIFOs are used by the converter control 56 to send status messages to the socket processes.

Converter control 56 and monitor module 58 also communicate through a portion of the shared memory 52. Before signalling the converter control 56 that a command is ready for processing, the monitor module 58 places a functionality command in memory and sets a busy flag in the shared memory. By checking this flag, the monitor module 58 does not overwrite a command string before converter control module 56 processes it. When the converter control 56 is finished processing a command it resets the busy flag so the monitor module 58 may present the next command string for processing.

In the preferred embodiment, the version of the UNIX operating system identified above includes a library routine (inetd) which supports communication in the TCP/IP protocol by opening connections to the operating system. The configuration file of that library routine has been modified so that it spawns a socket process for a terminal when an interrupt is received that indicates a terminal is initiating communication with telephony controller 20. The socket process receives communication from the computer terminal, strips out the TCP/IP protocol elements, and passes the functionality command to the monitor module 58. After the socket process has been spawned and has verified the converter control module 56 is operating, it opens a FIFO 62 in shared memory for the socket process. The FIFO 62 is identified with the process number assigned to the socket process when spawned. When the converter control 56 has information to transmit to a terminal, it passes the message to the socket process which in turn encapsulates the message within the TCP/IP protocol for transmission to the terminal.

Figure 3:
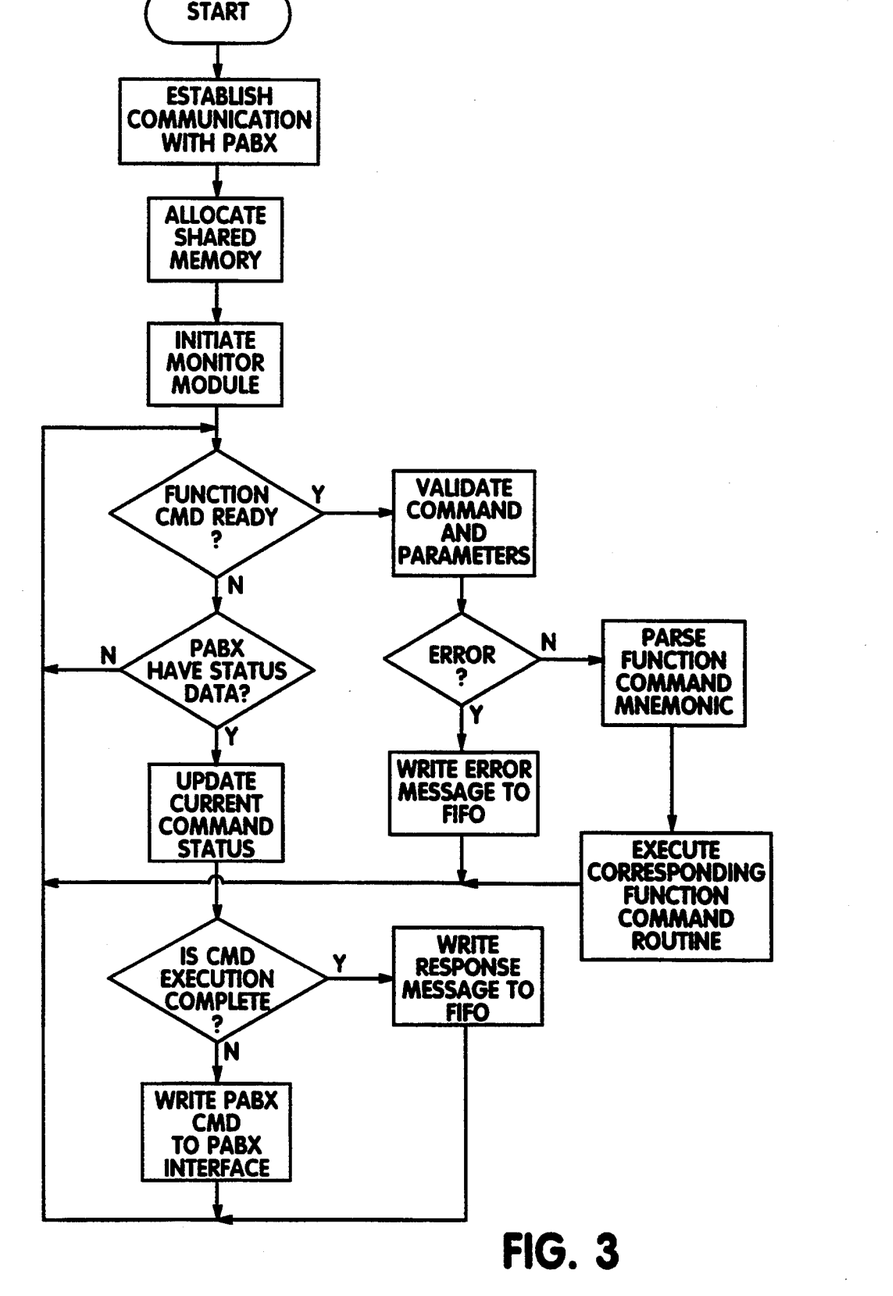
FIG. 3 is a flow chart that represents the processing performed by the converter control module of the telephony controller of the present invention.

The processing of the converter control 56 is shown in FIG. 3. Once initiated, converter control 56 establishes communications with the PABX through the PABX interface 40 to determine the type of PABX and its mode of operation. The type of PABX and its corresponding mode of operation determine whether the converter control 56 either responds to telephony event messages generated by the PABX or polls the PABX periodically for telephony event information. The mode of operation for receiving data from the PABX is vendor dependent. Once communication is established, converter control 56 allocates the shared memory and the communication FIFO 60 needed to support communication between the converter control 56, the monitor module 58, and the socket processes. Converter control 56 also initiates the monitor module 58 so communication with the computer terminals through the socket processes is possible.

Following initialization, converter control 56 checks to see if a functionality command is ready for processing. If it is not, the PABX is polled for status information (if the PABX is in a polled mode of operation, otherwise the status information is received via interrupt processing). These checks are performed until there is a task for the converter control to perform.

If PABX status is received, either by polling or interrupt processing, the status of the current command being executed is updated accordingly. If the status indicates the command execution is finished, a response message confirming command execution is generated and placed in the appropriate FIFO 62 for the corresponding socket process and the busy flag in shared memory is reset. If the PABX status indicates that a communication device is ready for further control to complete a telephony control event, the next PABX command to complete the control action is generated and transmitted to the PABX. The converter control then returns to waiting for a task to perform.

If converter control 56 is not executing a functionality command and one is available for execution, converter control 56 retrieves it from the shared memory 52 and validates the command and parameters. In this step, the converter control is verifying that the command mnemonic is one of the functionality command codes recognized by the controller and that the parameter data for the command is correct. For example, a phone number passed with a make call function command is checked to see that it has the correct number of digits. If the command fails validation, an error message is written to FIFO 62 for the socket process corresponding to the command originating terminal and converter control module 56 returns to looking for a task to perform. If the command is validated, the function command mnemonic is parsed and the corresponding function routine for the command is executed. The exemplary processing of a function routine is provided in more detail below. Following execution of the command, the converter control 56 returns to looking for a task to perform. In the event of a shutdown, converter control 56 terminates all socket processes, closes the communication with the PABX, terminates the monitor module, and removes the shared memory block.

The processing of the monitor module 58 is shown in more detail in FIG. 4. Once initiated, the monitor module 58 periodically checks the communication FIFO 60 in the shared memory 52 for data messages from a socket process. Once a message is retrieved from the FIFO, its checksum is verified. If the checksum indicates a transmission error, an error message is written to the FIFO 62 for the socket process corresponding to the command originating terminal. If the checksum is correct, the status of the busy flag is checked. If the busy flag is set, the monitor module loops until the converter control 56 resets the flag. If the busy flag is reset, the functionality command and accompanying parameters are passed to the converter control 56 through the shared memory 52. The busy flag is also set so the monitor module does not later overwrite the command. The monitor module 58 then returns to looking for other messages from socket processes.

The processing of a socket process is shown in FIG. 5. At initiation, the socket process verifies that the converter control module 56 is executing by confirming that the shared memory has been allocated and the communication FIFO for the monitor module 58 exists. If the converter control module 56 is not executing, the socket process terminates. If the controller is operating, the newly spawned socket process then opens its FIFO for receiving communication from the converter control module 56. Following this initiation process, the socket process looks for a command message from a terminal. If one is not available, the process looks for a message to the terminal in the FIFO corresponding to the socket process. Once a message is received from a terminal, the socket process strips out the TCP/IP protocol elements and writes the command message to the communication FIFO. Before writing the message, the busy flag is checked to see if it is set. If it is, the socket process waits for the flag to be reset and then sets the busy flag so another socket process does not overwrite the message. After the message is written to the communication FIFO, it resets the busy flag and returns to looking for messages to process. If the socket process detects a message in the shared memory FIFO for the terminal, the message is read from the FIFO, encapsulated within the TCP/IP protocol and transmitted to the terminal.

The function command routines within the converter control module 58 are specific for each vendor's PABX. A software library containing the routines for each vendor are used to configure the converter control module 56 for use with the PABX interface provided for the telephony controller 20. Additional control capability may be provided in a telephony controller made in accordance with the principles of the present invention by supplying more than one PABX interface and configuring the converter control module 56 with the function command routine libraries for each interface. Additionally, a file identifying which trunk lines are monitored with the respective PABXs would have to be provided so the converter control 56 would be able to select the correct library of function command routines and utilize the correct PABX interface in communicating with the appropriate PABX.

Figure 6:
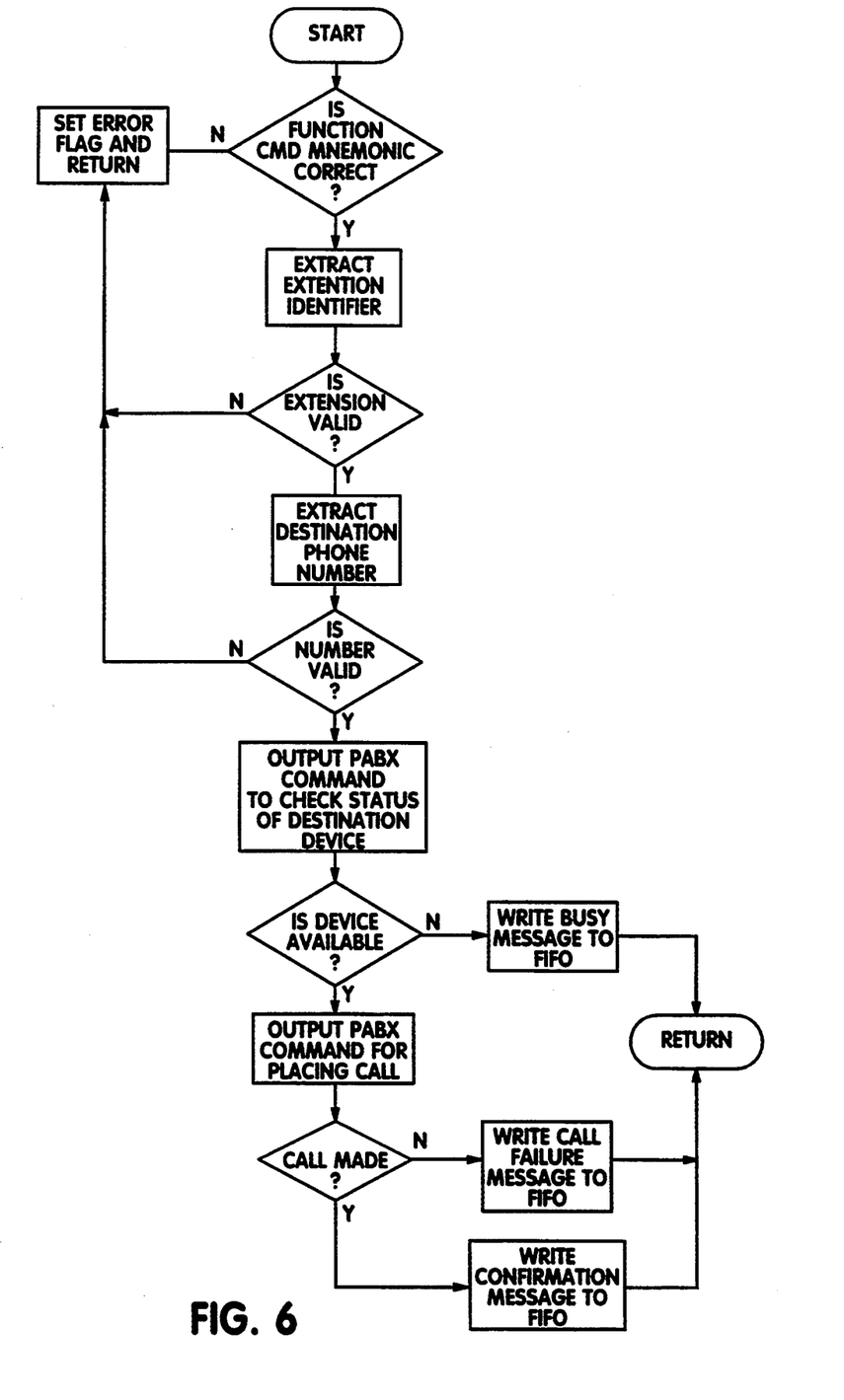
FIG. 6 is a flow chart that represents the processing performed by an exemplary function command routine of the telephony controller of the present invention.

The processing for an exemplary function command routine (MKC) corresponding to an AT&T Definity PABX is shown in FIG. 6. After the converter control module 56 calls the make call routine, the make call routine parses the function command mnemonic to determine that the three ASCII character mnemonic indicates a make call (MKC) command. If the command mnemonic is incorrect, an error flag is set and the routine returns. The make call routine next extracts the extension identifier from the command parameter following the first colon in the command string. The extension identifier is checked to see if it is valid, i.e., logged on, and that it is one being monitored by the converter control 56. The routine then extracts the phone number to be called which is the character string between the second and third colons in the command string. The phone number is verified by, for example, confirming the number of digits in the number is correct. The routine then outputs a command to the PABX to check whether the device is in a state for communication. After checking a predetermined number of times, the routine generates a busy response message if the device is unavailable. The busy response message is written to the FIFO for the command originating terminal. If the PABX returns a status indicating the device is available for communication, the PABX commands necessary to make the call are transmitted to the PABX and the routine waits for confirmation. If the PABX reports the call was made, the call is assigned an identifier that is associated with the extension number and a confirmation message is written to the FIFO for the socket process corresponding to the command originating terminal. If an error status is returned from the PABX, a failure message indicating the cause of the failure is written to the FIFO for the terminal.

While the present invention has been illustrated by the description of alternative embodiments, and while the embodiments have been described in considerable detail, it is not the intention of the applicant to restrict or in anyway limit the scope of the appended claims to such detail. Additional advantages and modifications will readily appear to those skilled in the art. The invention in its broadest aspects is therefore not limited to the specific details, representative controller and method and illustrative examples shown and described. Accordingly, departures may be made from such details without departing from the spirit or scope of applicant's general inventive concept.

What is claimed:

1. A telephony controller for controlling a private automatic branch exchange (PABX) comprising:
   a communication layer for receiving functionality commands from a plurality of command originating computer terminals, said functionality commands conforming to a single functionality command protocol;
   a functionality command converter for converting said functionality commands received by said communication layer to PABX commands; and
   a PABX interface for transmitting said PABX commands to a PABX and for receiving PABX status information from said PABX, whereby said command originating computer terminals may control and monitor said PABX.

2. The controller of claim 1 further comprising:
   a shared memory for communicating between said communication layer and said functionality command converter.

3. The controller of claim 2, said shared memory further comprising:
   a communication FIFO for receiving said functionality commands from said communication layer.

4. The controller of claim 3 wherein said communication layer receives command status messages from said functionality command converter for transmission to one of said command originating computer terminals in said plurality.

5. The controller of claim 4, said communication layer further comprising:
   a socket process for each of said command originating terminals.

6. The controller of claim 5, said shared memory further comprising:
   a socket process FIFO for communicating said command status messages from said functionality command converter to said socket process corresponding to one of said command originating terminals.

7. The controller of claim 6, said functionality command converter further including:
   a converter control module for converting said functionality commands and transmitting said PABX commands to said PABX interface; and
   a monitor module for receiving and verifying said functionality commands from said socket processes, said monitor module provides said verified functionality commands to said converter control module.

8. The controller of claim 7, said verified functionality commands are provided to said converter control module through said shared memory.

9. The controller of claim 7, wherein said converter control module receives PABX status information from said PABX interface, generates command status messages in response to said PABX status information, and writes said command status messages to one of said socket process FIFOs in said shared memory, said one socket process FIFO corresponding to said socket process for one of said command originating computer terminals.

10. The controller of claim 1, said functionality command converter further comprising:
    a first library of function command routines for converting functionality commands to PABX commands for a vendor specific PABX.

11. The controller of claim 10, further comprising:
    a second PABX interface for a second PABX; and
    a second library of function command routines for converting functionality commands to PABX commands for said second PABX.

12. The controller of claim 1, wherein said single functionality command protocol includes:
    a command mnemonic;
    a command originating terminal identifier; and
    command parameter data for converting said function commands to said PABX commands.

13. The controller of claim 12 wherein said command mnemonic, said command originating terminal identifier, and said command parameter data are provided in an ASCII string and said command mnemonic, said originating terminal identifier, and said command parameter data are delimited by a field delimiter.

14. A method for interfacing a computer terminal to a private automatic branch exchange (PABX) comprising the steps of:
    receiving functionality commands from one of a plurality of command originating computer terminals, said functionality commands being in a predetermined single functionality command protocol;
    converting said functionality commands to PABX commands corresponding to a vendor specific PABX; and
    transmitting said PABX commands to a PABX interface for controlling said PABX.

15. The method of claim 14, said receiving step further comprising:

verifying said receipt of said functionality commands; and transmitting a transmission status message to said command originating terminal.

16. The method of claim 14, said converting step further comprising:

parsing a function command mnemonic;

verifying command data parameters within said functionality command; and generating vendor specific PABX commands corresponding to said function command mnemonic and said verified function command data.

17. The method of claim 14, said converting step further comprising:

receiving PABX status information from said PABX;

updating a functionality command execution status in response to said PABX status information;

generating PABX commands in response to a function command execution status indicating incomplete execution; and transmitting a function command status message to one of said command originating terminals in response to a function command status indicting completion of function command execution.

* * * * *

(12) REEXAMINATION CERTIFICATE (4696th)
United States Patent
Flisik et al.

(10) Number: US 5,414,762 C1
(45) Certificate Issued: Dec. 31, 2002

(54) TELEPHONY CONTROLLER WITH FUNCTIONALITY COMMAND CONVERTER

(75) Inventors: Robert C. Flisik, Cincinnati, OH (US); Mark Johnson, Cincinnati, OH (US)

(73) Assignee: Q.SYS International, Inc., Cincinnati, OH (US)

Reexamination Request:
No. 90/005,567, Nov. 23, 1999

Reexamination Certificate for:
Patent No.: 5,414,762
Issued: May 9, 1995
Appl. No.: 08/183,992
Filed: Jan. 18, 1994

(51) Int. Cl.$^7$ .............................................. H04M 3/22
(52) U.S. Cl. .............. 379/198; 379/93.15; 379/201.03; 379/201.05; 379/230; 379/242
(58) Field of Search .................. 379/201, 207, 379/265, 309, 201.01, 201.02, 201.03, 201.05, 201.12, 207.02, 265.02, 93.15, 157, 198, 202.01, 203.01, 204.01, 205.01, 206.01, 225, 227, 230, 231, 232, 234, 242, 268, 269; 370/259, 442

(56) References Cited

U.S. PATENT DOCUMENTS

| 3,867,582 A | 2/1975 | Weed et al. |
| 4,259,549 A | 3/1981 | Stehman |
| 4,408,323 A | 10/1983 | Montgomery |
| 4,477,698 A | 10/1984 | Szlam et al. |
| 4,540,855 A | 9/1985 | Szlam et al. |
| 4,623,760 A | 11/1986 | Blinkerd et al. |
| 4,656,623 A | 4/1987 | Dalby, Jr. et al. |

(List continued on next page.)

FOREIGN PATENT DOCUMENTS

DE 2723-667 A1 5/1977

OTHER PUBLICATIONS

Genesys Laboratories, "Telephony Local Area Network Interface T" (1992).
IBM, "CallPath Services—Programmer's Reference" (1992).
ROLM, "ROLM CallBridge—IBM SwitchServer/2 Option" (1991).
Northern Telecom, "Introducing CallPath/400 to Meridian Link Intergration" (1991).
IBM, "CallPath Services—References for AT & T Definity Generic 3 PBX" (1992/1994).
Maikranz, "IBM's CallPath Explained", Inbound/Outbound Magazine (Oct. 1989).
AT & T, "AT & T Bell Labs Memo re OCM R1V3.2.1 Release Notes" (1991).

(List continued on next page.)

Primary Examiner—Harry Hong (57) ABSTRACT

A telephony controller for controlling a private automatic branch exchange (PABX) is disclosed that utilizes a single functionality command protocol to reduce the data traffic on a computer network or the like used to control a PABX. The telephony controller includes a functionality command converter, a communication layer for communicating with computer terminals on the computer network, and a PABX interface for communicating with the PABX. The single functionality command protocol uses a generic command format for a number of function commands that are converted by the functionality command converter into the PABX commands corresponding to the vendor specific PABX. The functionality converter generates the PABX commands to implement a function command and monitors the PABX to determine whether the command has been implemented. The functionality command converter generates data messages corresponding to the outcome of the functionality command execution which are transmitted to the command originating terminal. Additionally, the telephony controller is capable of controlling different vendor PABXs without requiring any change in the communication format between the controller and the computer terminals.

U.S. PATENT DOCUMENTS

| | | |
|---|---|---|
| 4,656,624 A | 4/1987 | Collins et al. |
| 4,719,617 A | 1/1988 | Yanosy, Jr. et al. |
| 4,720,853 A | 1/1988 | Szlam et al. |
| 4,741,028 A | 4/1988 | Frimmel, Jr. et al. |
| 4,742,537 A | 5/1988 | Jesurum |
| 4,742,538 A | 5/1988 | Szlam |
| 4,742,539 A | 5/1988 | Szlam et al. |
| 4,763,317 A | 8/1988 | Lehman et al. |
| 4,782,510 A | 11/1988 | Szlam |
| 4,788,719 A | 11/1988 | Gupta |
| 4,796,294 A | 1/1989 | Nakagawara |
| 4,797,911 A | 1/1989 | Szlam et al. |
| 4,805,209 A | 2/1989 | Baker et al. |
| 4,817,130 A | 3/1989 | Frimmel, Jr. |
| 4,829,514 A | 5/1989 | Frimmel, Jr. et al. |
| 4,837,798 A | 6/1989 | Cohen et al. |
| 4,858,120 A | 8/1989 | Samuelson |
| 4,864,601 A | 9/1989 | Berry |
| 4,864,605 A | 9/1989 | Ramsay et al. |
| 4,866,758 A | 9/1989 | Heinzelmann |
| 4,894,857 A | 1/1990 | Szlam et al. |
| 4,916,726 A | 4/1990 | Morely et al. |
| 4,918,682 A | 4/1990 | Finegan |
| 4,933,964 A | 6/1990 | Girgis |
| 4,996,685 A | 2/1991 | Farese et al. |
| 5,001,701 A | 3/1991 | Gay |
| 5,007,000 A | 4/1991 | Baldi |
| 5,007,080 A | 4/1991 | MacMillan et al. |
| 5,008,930 A | 4/1991 | Gawrys et al. |
| 5,014,266 A | 5/1991 | Bales et al. |
| 5,021,949 A | 6/1991 | Morten et al. |
| 5,036,535 A | 7/1991 | Gechter |
| 5,040,208 A | 8/1991 | Jolissaint |
| 5,046,088 A | 9/1991 | Margulies |
| 5,054,059 A | 10/1991 | Stern et al. |
| 5,056,088 A | 10/1991 | Price et al. |
| 5,070,525 A | 12/1991 | Szlam et al. |
| 5,072,441 A | 12/1991 | Szware |
| 5,073,890 A | 12/1991 | Danielsen |
| 5,086,497 A | 2/1992 | Horikawa et al. |
| 5,097,528 A | 3/1992 | Gursahaney et al. |
| 5,103,475 A | 4/1992 | Shuen |
| 5,113,429 A | 5/1992 | Morely et al. |
| 5,140,590 A | 8/1992 | Gertsman |
| 5,142,622 A | 8/1992 | Owens |
| 5,146,561 A | 9/1992 | Carey et al. |
| 5,148,474 A | 9/1992 | Haralambopoulo |
| 5,155,761 A | 10/1992 | Hammond |
| 5,159,684 A | 10/1992 | Kroll et al. |
| 5,166,974 A | 11/1992 | Morganstein et al. |
| 5,179,584 A | 1/1993 | Tsumura |
| 5,179,589 A | 1/1993 | Syu |
| 5,181,239 A | 1/1993 | Jolissaint |
| 5,182,748 A | 1/1993 | Sakata et al. |
| 5,185,782 A | 2/1993 | Srinivasan |
| 5,187,710 A | 2/1993 | Chau et al. |
| 5,187,787 A | 2/1993 | Skeen et al. |
| 5,214,688 A | 5/1993 | Szlam et al. |
| 5,218,623 A | 6/1993 | Cool |
| 5,235,595 A | 8/1993 | O'Dowd |
| 5,249,222 A | 9/1993 | Pinard |
| 5,259,024 A | 11/1993 | Morely et al. |
| 5,274,634 A | 12/1993 | Babiarz |
| 5,278,898 A | 1/1994 | Cambray et al. |
| 5,278,972 A | 1/1994 | Baker et al. |
| RE34,536 | 2/1994 | Frimmel, Jr. |
| 5,291,492 A | 3/1994 | Andrews et al. |
| 5,309,505 A | 5/1994 | Szlam et al. |
| 5,309,513 A | 5/1994 | Rose |
| 5,311,583 A | 5/1994 | Friedes et al. |
| 5,325,290 A | 6/1994 | Cauffman et al. |
| 5,327,491 A | 7/1994 | Syu |
| 5,329,583 A | 7/1994 | Jurgensen et al. |
| 5,335,269 A | 8/1994 | Steinlicht |
| 5,341,412 A | 8/1994 | Ramot et al. |
| 5,343,519 A | 8/1994 | Feldman |
| 5,359,508 A | 10/1994 | Rossides |
| 5,400,327 A | 3/1995 | Dezonno |
| 5,402,474 A | 3/1995 | Miller et al. |
| 5,420,852 A | 5/1995 | Anderson et al. |
| 5,425,083 A | 6/1995 | Furuya et al. |
| 5,425,093 A | 6/1995 | Trefzger |
| 5,430,792 A | 7/1995 | Jesurum et al. |
| 5,432,845 A | 7/1995 | Burd et al. |
| 5,469,491 A | 11/1995 | Morley, Jr. et al. |
| 5,511,112 A | 4/1996 | Szlam |
| 5,533,103 A | 7/1996 | Peavey et al. |
| 5,544,220 A | 8/1996 | Trefzger |
| 5,581,602 A | 12/1996 | Szlam et al. |
| 5,594,791 A | 1/1997 | Szlam et al. |
| 5,640,445 A | 6/1997 | David |
| 5,652,791 A | 7/1997 | Sunderman et al. |
| 5,655,001 A | 8/1997 | Cline et al. |
| 5,675,637 A | 10/1997 | Szlam et al. |
| 5,687,225 A | 11/1997 | Jorgensen |
| 5,715,307 A | 2/1998 | Zazzera |
| 5,757,644 A | 5/1998 | Jorgensen |
| 5,828,731 A | 10/1998 | Szlam |
| 5,832,059 A | 11/1998 | Aldred et al. |
| 5,867,559 A | 2/1999 | Jorgensen et al. |
| 5,907,601 A | 5/1999 | David et al. |
| RE36,416 | 11/1999 | Szlam et al. |

OTHER PUBLICATIONS

OCM, "Outbound Call Management System Manual" (1991).

IBM Rolm Systems, "9751 CBX Model 10 System Description Manual–Release 9005" (1989).

ROLM, "ROLM CallBridge for the IBM CallPath Switch-Server/2" (Sep. 1991).

Northern Telecom, "Announcing Direct Route/2: A New IBM Product for Call Centers" (Jul. 1991).

Keith Dawson, "The Smart Way to Handles Incoming Callers," Inbound/Outbound Magazine, p. 22–34, (May, 1990).

IBM, "CallPath CICS and CallPath SwitchServer/2 General Information, Release 1.0," p. 1–3, (1991).

IBM, "CallPath Call Coordinator CICS/MVS General Information, Release 1," excerpts, (1992).

Lisa Roger, "Electronic Information Systems, The New Platform User Interface Engineering Reference Specification," EIS International, p. 1–26, (Jan. 13, 1993).

A. Collins et al., "Electronic Information Systems, Engineering Requirements Specification for The New Platform," EIS International, (Feb. 19, 1993).

EIS International, "Millenium Releae 1.0," (Aug. 4, 1993).

Digital Equipment Corp., "Computer Integrated Telephony (CIT) Linking Voice Switches to Digital Computers," (1992).

Digital Equipment Corp., "Software Product Description— DEC Computer Integrated Telephony Applications Interface for ULTRIX, Version 3.0," (Sep. 1991).

Digital Equipment Corp., "Software Product Description— DEC Computer Integrated Telephony Server 100/500, Version 1.0," (Sep. 1991).

Digital Equipment Corp., "DEC CIT Applications Interface for VMS Programming," (Sep. 1991).

IBM, Internet Printouts of IBM Products Announcements Disclosing IBM Call Path Products (19 documents), (1991, 1992).

IBM, "CallPath Services: Reference for Northern Telecom Meridian 1 PBX," (Sep. 1993).

IBM, "CallPath Services: Using Call Path SwitchServer/2", excerpts, (Sep. 1993).

Digital Equipment Corporation, "Software Product Description for DEC's Computer Integrated Telephony (CIT) Products," (Sep. 1991).

R. Walters, "Computer Telephony Integration," excerpts, (1998).

Genesys, "Printout From Genesys Website," (Nov. 16, 1999).

Mar. 25, 1999 Letter from Jeffrey Kaplan Regarding U.S. Patent No. 5,414,762.

Preliminary Invalidity Contentions for All Claims of the Q.Sys Patent in View of the '492 Patent to Andrews et al.

Digital Equipment Corp., "Software Product Description—DEC Computer Integrated Telephony Server 100/500, Version 1.0A," (Apr. 1993).

Digital Equipment Corp., "Software Description—DEC Computer Integrated Telephony Applications Interface for MS Windows, Version 1.0A" (Apr. 1993).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 14 are determined to be patentable as amended.

Claims 2–13 and 15–17, dependent on an amended claim, are determined to be patentable.

1. A telephony controller for controlling a private automatic branch exchange (PABX) comprising:
   a communication layer for receiving *a set of* functionality commands from a plurality of command originating computer terminals, said functionality commands conforming to a single functionality command protocol *and each being used to implement a corresponding one of a plurality of high level functions*;
   a functionality command converter for converting *each of* said functionality commands received by said communication layer to *a corresponding plurality of* PABX commands, *said corresponding plurality of PABX commands being used to implement a corresponding one of said high level functions*; and
   a PABX interface for transmitting said *corresponding plurality of* PABX commands to a PABX and for receiving PABX status information from said PABX, whereby said command originating computer terminals may control and monitor said PABX.

14. A method for interfacing a computer terminal to a private automatic branch exchange (PABX) comprising the steps of:
    receiving functionality commands from one of a plurality of command originating computer terminals, said functionality commands being in a predetermined single functionality command protocol *and each of said commands being used to implement a corresponding one of a plurality of high level functions*;
    *for each of said functinality commands,* converting said functionality command[s] to *a corresponding plurality of* PABX commands corresponding to a vendor specific PABX *for implementing said corresponding one of said high level functions*; and
    transmitting said *corresponding plurality of* PABX commands to a PABX interface for controlling said PABX.

* * * * *